(12) United States Patent
Bornstein

(10) Patent No.: US 12,407,883 B2
(45) Date of Patent: Sep. 2, 2025

(54) COMPUTERIZED SYSTEMS AND METHODS FOR A FAN-ENGAGEMENT PLATFORM WITH PLAYERS OF REAL-TIME GAMEPLAY

(71) Applicant: Scott Bornstein, Syosset, NY (US)

(72) Inventor: Scott Bornstein, Syosset, NY (US)

( * ) Notice: Subject to any disclaimer, the term of this patent is extended or adjusted under 35 U.S.C. 154(b) by 13 days.

(21) Appl. No.: 18/512,107

(22) Filed: Nov. 17, 2023

(65) Prior Publication Data

US 2025/0168434 A1    May 22, 2025

(51) Int. Cl.
*H04N 21/254* (2011.01)
*H04L 9/00* (2022.01)

(52) U.S. Cl.
CPC ........... *H04N 21/2542* (2013.01); *H04L 9/50* (2022.05)

(58) Field of Classification Search
CPC .............................. H04N 21/2542; H04L 9/50
See application file for complete search history.

(56) References Cited

U.S. PATENT DOCUMENTS

| | | | |
|---|---|---|---|
| 11,134,041 B1* | 9/2021 | He | G06Q 20/065 |
| 2016/0171481 A1* | 6/2016 | McElmurry, IV | G06Q 20/3255 705/39 |
| 2020/0380624 A1* | 12/2020 | Turgman | G06Q 20/02 |
| 2023/0108298 A1* | 4/2023 | Sen | H04L 65/75 709/231 |

* cited by examiner

*Primary Examiner* — Oschta I Montoya
(74) *Attorney, Agent, or Firm* — Nicholas Martin; Greenberg Traurig, LLP

(57) ABSTRACT

Disclosed are systems and methods that provide a computerized electronic and digital asset/resource management framework that provides novel capabilities for users (or fans) to interact with participants of a live-event (e.g., athletes currently playing in a sporting event). According to some embodiments, the disclosed framework provides a blockchain-based platform designed to revolutionize the engagement of sports fans and athletes by providing novel capabilities for fans to interact and/or reward athletes for exceptional plays and highlights in real-time. Leveraging blockchain technology and smart contracts, the disclosed framework provides an innovative application/platform for which NIL rewards in the world of sports can be leveraged, thereby increasing the fan experience while ensuring equity among the participants of the real-time gameplay.

19 Claims, 6 Drawing Sheets

COMPUTERIZED SYSTEMS AND METHODS FOR A FAN-ENGAGEMENT PLATFORM WITH PLAYERS OF REAL-TIME GAMEPLAY

FIELD OF THE DISCLOSURE

The present disclosure is generally related to electronic and/or digital content and resource management, and more particularly, to a decision intelligence (DI)-based computerized framework that enables spectators to directly engage with participants in a live-event (e.g., sporting event).

SUMMARY OF THE DISCLOSURE

According to some embodiments, the disclosed systems and methods provide a novel, computerized framework that provides functionality for spectators (e.g., users or fans or those watching a live event) to partake in direct engagement with those participating in the live event.

For purposes of this disclosure, the live event will be discussed as a sporting event (e.g., a college football game, for example); however, it should not be construed as limiting, as any type of live or on-demand event can form the basis of the disclosed framework's implementation and benefits without departing from the scope of the instant disclosure (e.g., a Broadway play, for example).

According to some embodiments, the disclosed framework leverages the emerging trend of Name, Image, and Likeness (NIL) in sports and enables fans to directly interact and compensate athletes for their exceptional performances. NIL refers to the ability of college athletes to profit from their own names, images, and likenesses. In the context of sports, this means that student-athletes can earn money through endorsements, sponsorships, and other opportunities while still competing in college. It is a significant change in NCAA (National Collegiate Athletic Association) rules, allowing athletes to benefit financially from their personal brands, which was previously restricted.

According to some embodiments, as discussed herein, athletes (or players, or participants, used interchangeably) can be compensated through various means. For example, such compensation can include, but is not limited to, fiat currency (e.g., cash, checks, direct deposit, and the like), cryptocurrency, endorsements, sponsorships, prize money, appearance fees, licensing and merchandising, equity or stock, and the like, or some combination thereof.

Accordingly, the evolving landscape of sports and technology avails the disclosed framework to provide an application and/or platform that provides new mechanisms for ways fans can engage with their favorite athletes. As discussed herein, the disclosed framework can enable fans to directly compensate players when they make exceptional plays or highlights, turning every game into an interactive and rewarding experience. This unique concept gives players more control over their financial futures and the opportunity to build stronger connections with their fan base. It also helps to level the playing field by allowing lesser-known players to receive recognition and support from their fans.

According to some embodiments, the disclosed framework can utilize blockchain technology and/or digital currencies to facilitate secure and transparent transactions between fans and players. As evidenced from the discussion herein, such platform configuration can enable transparency (e.g., Blockchain technology ensures that all transactions are recorded on a public ledger, guaranteeing transparency and trust in the platform); security (e.g., cryptocurrencies provide a high level of security, protecting both fans' and players' financial information); immediate transactions (e.g., the use of digital currency allows for instant transactions, enabling fans to reward players in real-time); and global accessibility (e.g., fans from all over the world can participate, as digital currencies have no geographical limitations).

It should, however, not be construed as limiting that blockchain and/or cryptocurrencies are required to effectuate the disclosed fan-to-athlete engagement, as one of skill in the art would readily understand that a user can remit electronic payment to a secure account of an athlete upon the computational detection of the "highlight", in a similar manner as discussed with reference to cryptocurrency transmission, as discussed herein.

According to some embodiments, a method is disclosed for an engagement platform that enables users (e.g., fans) to directly compensate athletes for their exceptional performances (or highlights), which can be during and/or after games. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for engagement platform that enables users (e.g., fans) to directly compensate athletes for their exceptional performances (or highlights), which can be during and/or after games.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
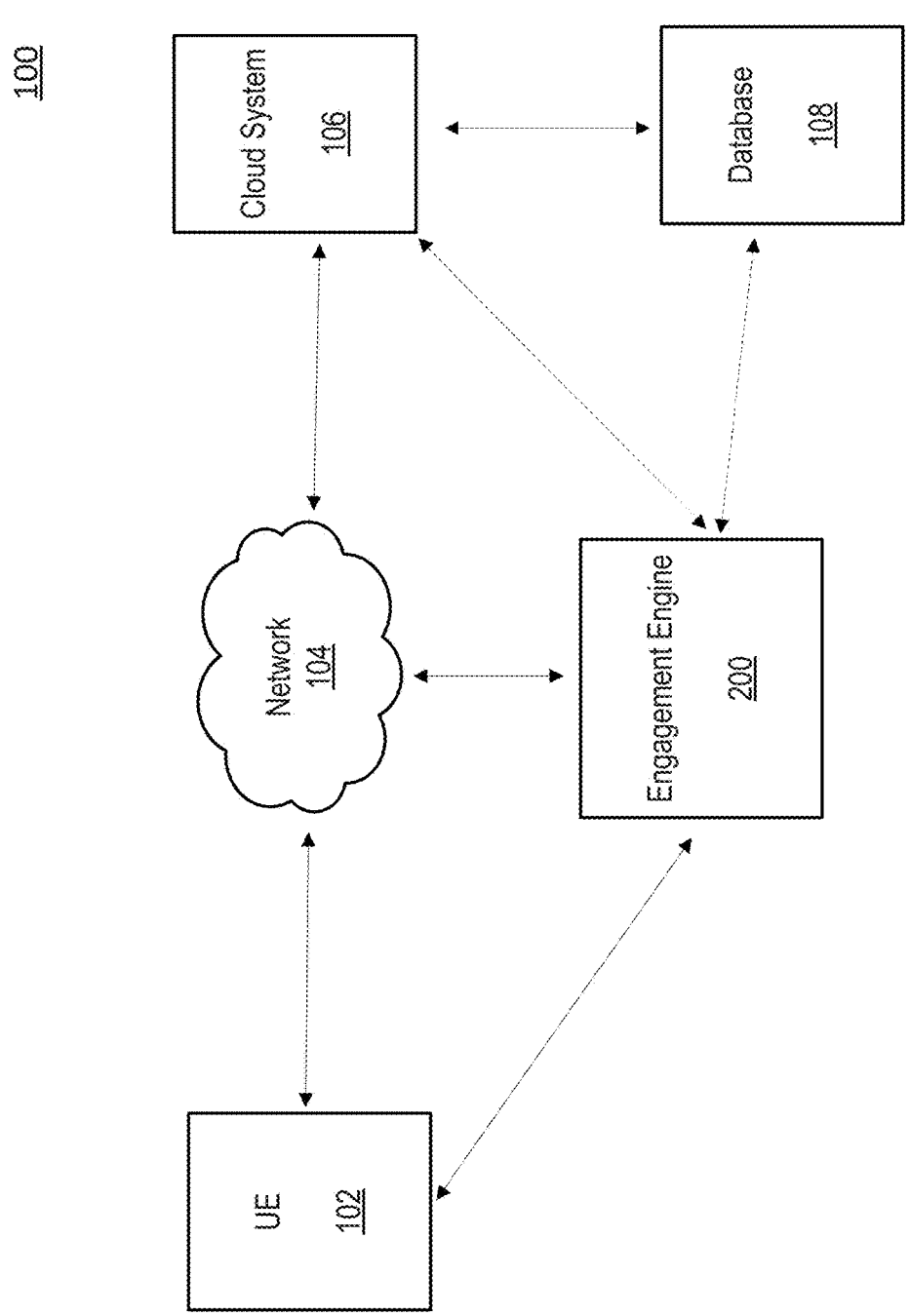
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or." as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/ acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/a/g/n/ac/ax/be, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures.

According to some embodiments, the disclosed framework can provide a computerized dynamic for fan-athlete interaction. As fans watch a game, whether live or televised, the disclosed framework (e.g., application executing a device of a user for example) can seamlessly integrate with the real-time action, allowing fans to interact with the platform through their smartphones. When a player delivers an extraordinary performance, the framework notifies fans, offering them the opportunity to reward the athlete in real-time.

Additionally, athletes can benefit from the disclosed framework by gaining a direct avenue for fan recognition and compensation. Athletes can register with the platform, associating their profile with their NIL status.

As evidenced from the disclosure herein, the disclosed framework has the potential to significantly enhance fan engagement in sports, transforming the traditional passive role of spectators. The disclosed platform introduces ways for fans to become more emotionally invested (e.g., fans become emotionally invested in the game, knowing that they have a direct stake in rewarding their favorite players when they deliver exceptional performances), as they can engage with the athletes/players via real-time interaction (e.g., the disclosed framework's real-time notifications ensure that fans remain actively engaged throughout the game, with their focus directed towards the athletes' performances).

As such, the disclosed systems and methods provide a framework that can redefine fan engagement and athlete empowerment within the sports industry. The disclosed framework's unique fusion of blockchain technology, smart contracts and digital currencies has the potential to revolutionize how fans interact with their favorite athletes, making the experience of watching sports more immersive, dynamic and rewarding.

With reference to FIG. 1, system 100 is depicted which includes user equipment (UE) 102 (e.g., a client device, as mentioned above and discussed below in relation to FIG. 6), network 104, cloud system 106, database 108 and engagement engine 200. It should be understood that while system 100 is depicted as including such components, it should not be construed as limiting, as one of ordinary skill in the art would readily understand that varying numbers of UEs, peripheral devices, cloud systems, databases and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, IoT device, wearable device, autonomous machine, smart television, media streaming device, game console, and any other device equipped with a cellular or wireless or wired transceiver.

In some embodiments, peripheral devices (not shown) can be connected to UE 102, and can be any type of peripheral device, such as, but not limited to, a wearable device (e.g., smart ring, smart watch, for example), printer, speaker, sensor, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based, which has associated network resources hosted on the internet or private network (e.g., network 104), which enables (via engine 200) the content and resource management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, and the services and applications provided by cloud system 106 and/or engagement engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 4:
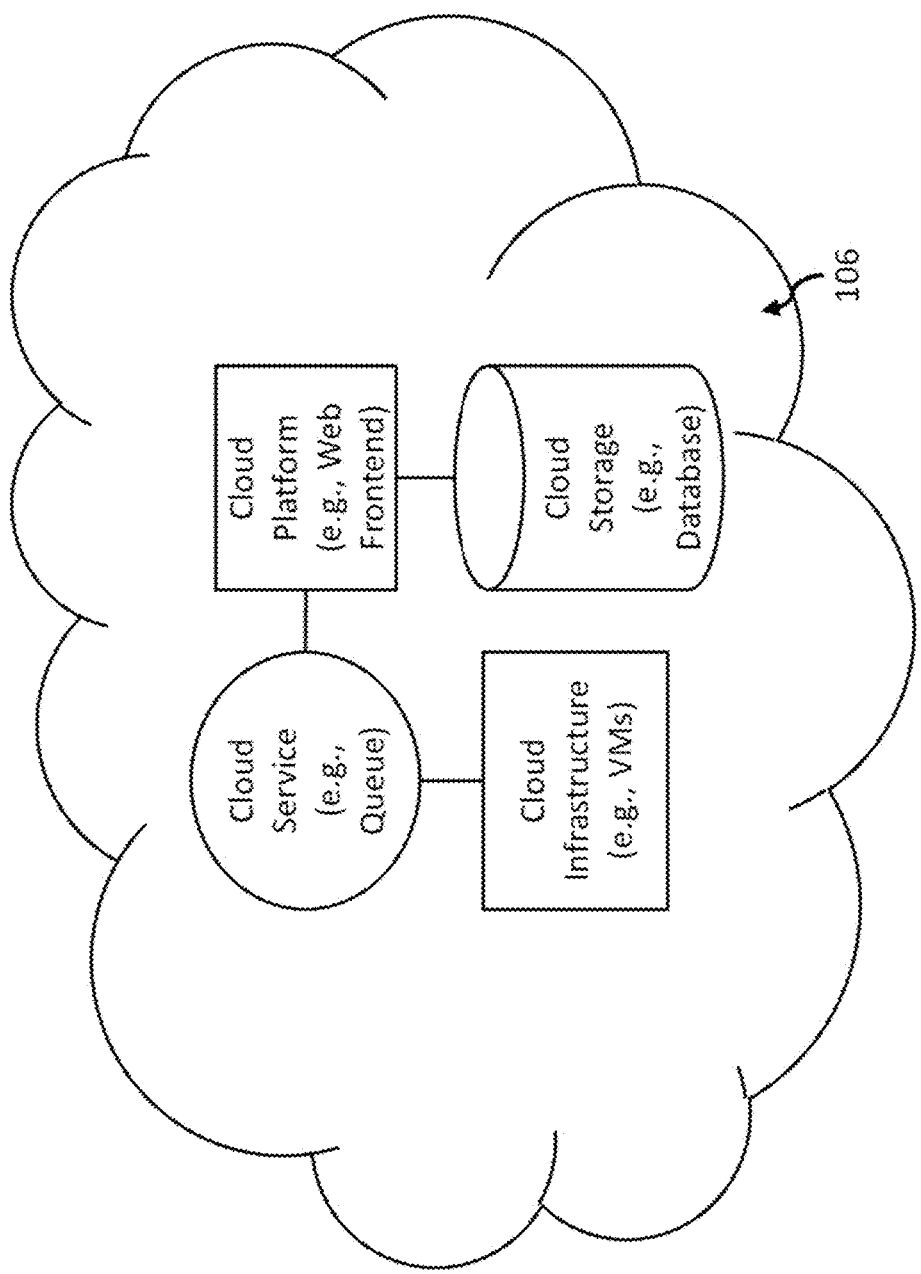
FIG. 4 depicts an exemplary implementation of an architecture according to some embodiments of the present disclosure.
Figure 5:
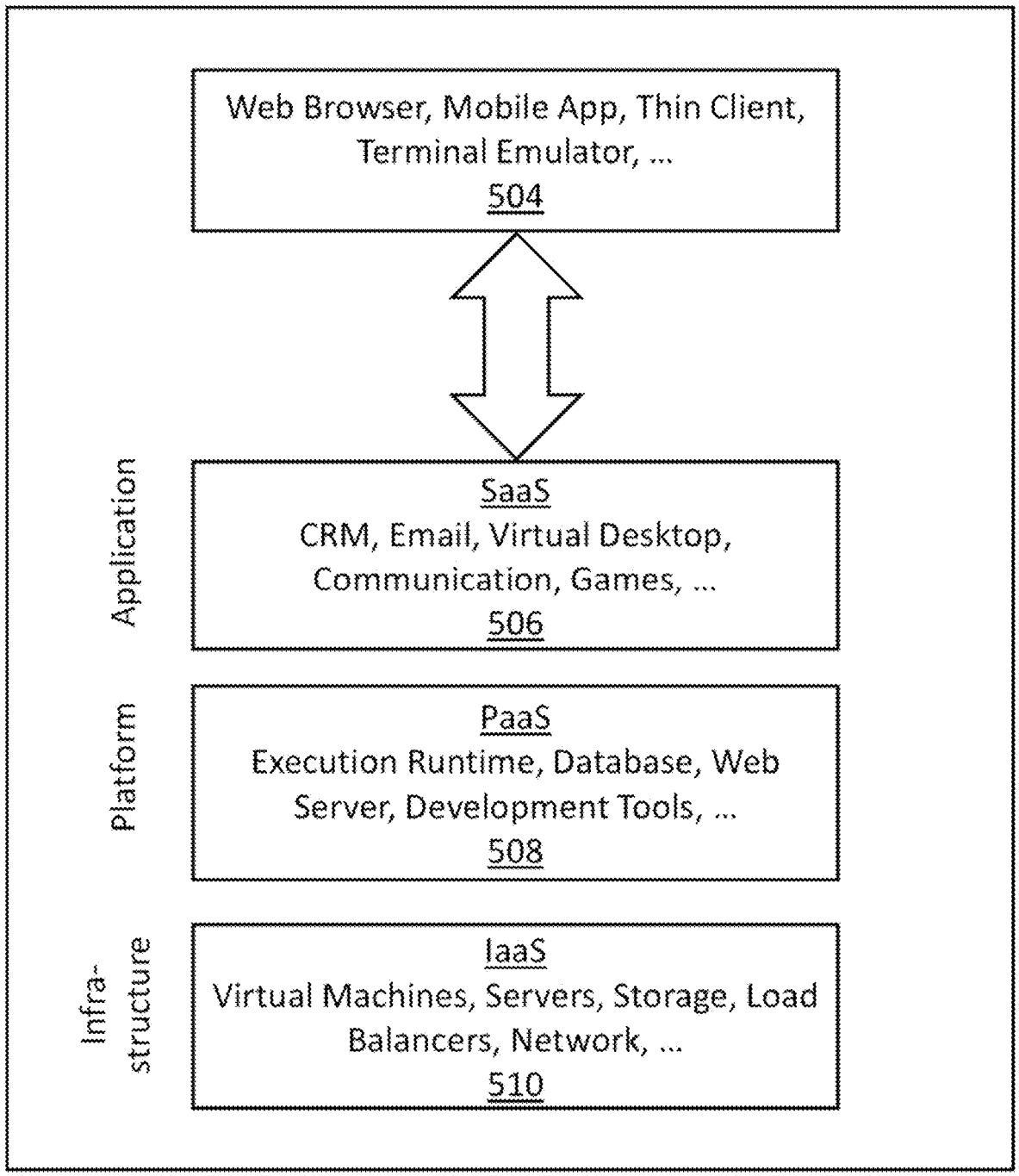
FIG. 5 depicts an exemplary implementation of an architecture according to some embodiments of the present disclosure.

Turning to FIGS. 4 and 5, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 510, platform as a service (PaaS) 508, and/or software as a service (SaaS) 506 using a web browser, mobile app, thin client, terminal emulator or other endpoint 504. FIGS. 4 and 5 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Engagement engine 200, as discussed above and further below in more detail, can include components for the disclosed functionality. According to some embodiments, engagement engine 200 may be a special purpose machine or processor, and can be hosted by a device on network 104, within cloud system 106, and/or on UE 102. In some embodiments, engine 200 may be hosted by a server and/or set of servers associated with cloud system 106.

According to some embodiments, as discussed in more detail below, engagement engine 200 may be configured to implement and/or control a plurality of services and/or microservices, where each of the plurality of services/microservices are configured to execute a plurality of workflows associated with performing the disclosed content and resource management. Non-limiting embodiments of such workflows are discussed and provided below.

According to some embodiments, as discussed above, engagement engine 200 may function as an application provided by cloud system 106. In some embodiments, engine 200 may function as an application installed on a server(s), network location and/or other type of network resource associated with system 106. In some embodiments, engine 200 may function as an application installed and/or executing on UE 102. In some embodiments, such application may be a web-based application accessed by UE 102, and/or devices over network 104 from cloud system 106. In some embodiments, engine 200 may be configured and/or installed as an augmenting script, program or application (e.g., a plug-in or extension) to another application or program provided by cloud system 106 and/or executing on UE 102.

Figure 2:
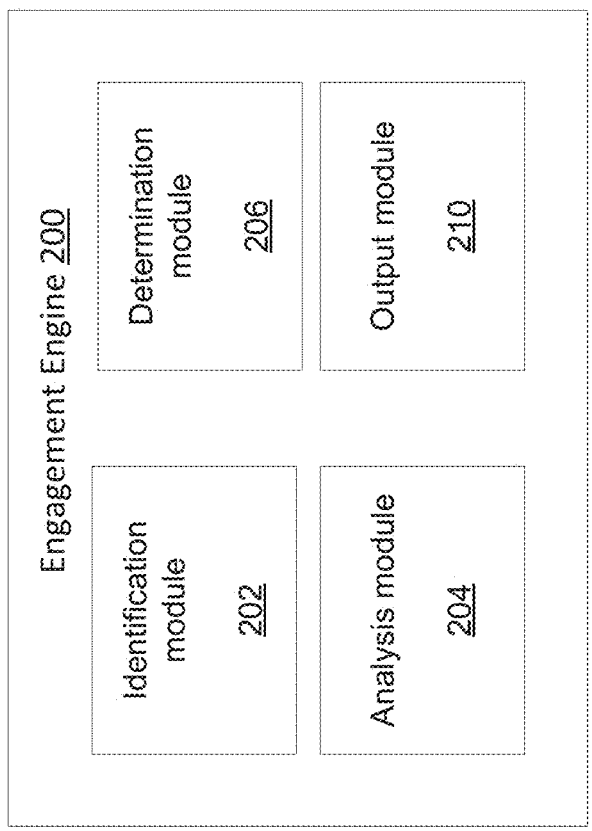
FIG. 2 is a block diagram illustrating components of an exemplary system according to some embodiments of the present disclosure.

As illustrated in FIG. 2, according to some embodiments, engagement engine 200 includes identification module 202, analysis module 204, determination module 206 and output module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
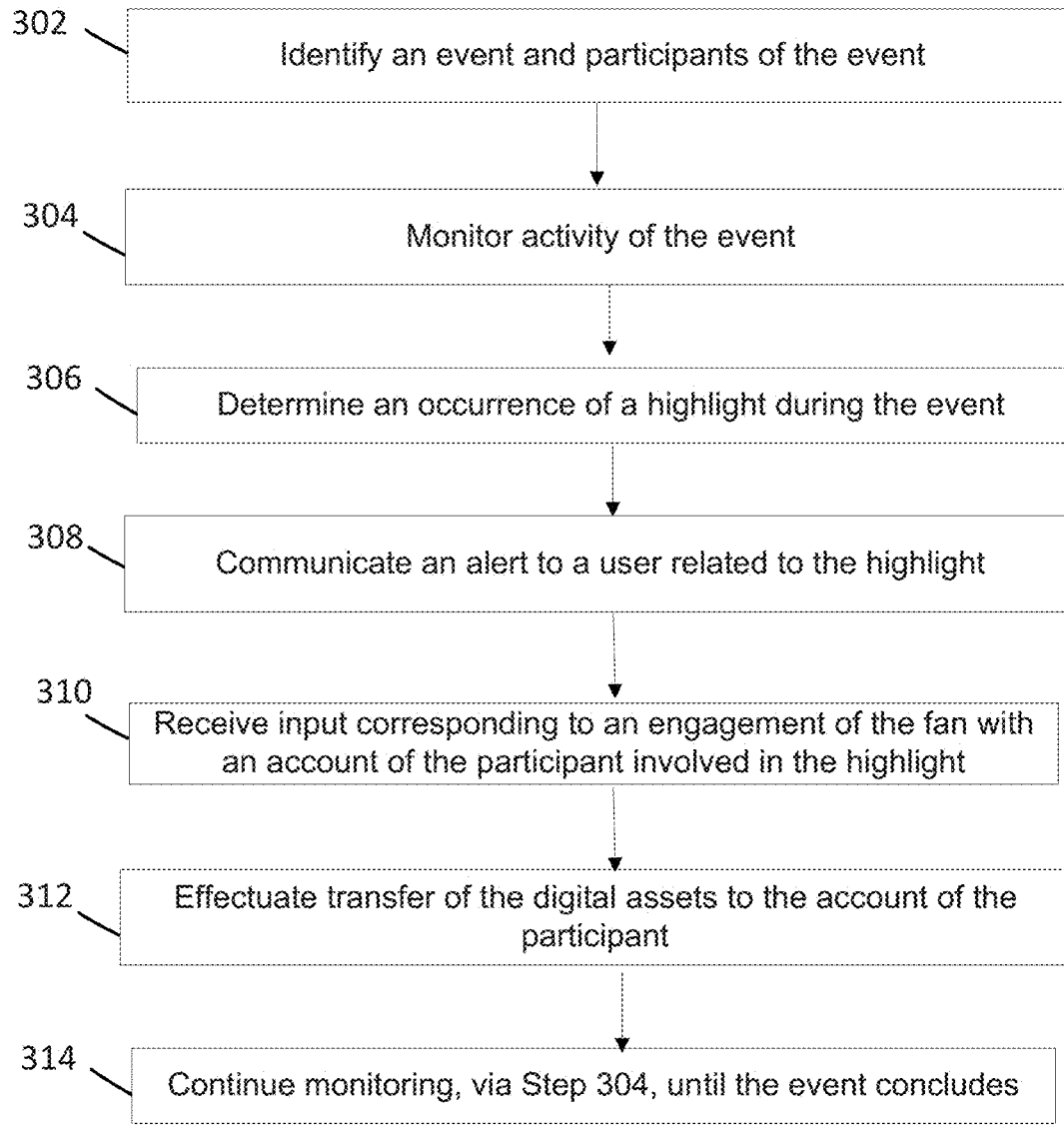
FIG. 3 illustrates an exemplary workflow according to some embodiments of the present disclosure.

Turning to FIG. 3, Process 300 provides non-limiting example embodiments for the disclosed content and resource management framework. According to some embodiments, Step 302 Process 300 can be performed by identification module 202 of engagement engine 200; Steps 304 and 314 can be performed by analysis module 204; Step 306 can be performed by determination module 206; and Steps 308-312 can be performed by output module 208.

According to some embodiments, Process 300 begins with Step 302 where engine 200 can identify an event and the participants of the event. The event, for example, can be a sporting event, and the participants can be the players on each team (e.g., the eligible players, as in some embodiments, those players that are injured and/or not active, can be filtered out of the participant listing). In some embodiments, a user (e.g., fan) can be viewing the event, where the user can be at the event and/or viewing (e.g., streaming) the event on a device (e.g., UE 102).

In Step 304, upon commencement of the event (e.g., start of the game), the game action is monitored. The monitoring can be continuous and/or according to predetermined and/or dynamically determined time period. Such monitoring can be based on a type of event. For example, if the event is a football game, the monitoring can start when the ball is hiked, and end when the referee blows their whistle (e.g., player tackled, out of bounds, in complete, timeout, touchdown, and the like). Similarly, if the game is a baseball game, the monitoring can start when the pitcher starts their windup, and end when the pitcher receives the ball again.

In some embodiments, Step 304 involves analyzing the game play data/metadata related to the content of the event. According to some embodiments, the computational analysis performed by engine 200 can involve any type of known or to be known computational analysis technique, algorithm, mechanism or technology to analyze the collected/monitored data for determinations whether a play of the game corresponds to a highlight (e.g., particularly exciting, interesting, or noteworthy moment or segment of gameplay that has been identified or captured for special attention—for example, a scoring play, a play that account for a certain threshold satisfying value (e.g., a football play of over 15 yards, a baseball hit of more than a single, and the like)). In some embodiments, a highlight can also correspond to a audio level or decibel level of the fans in attendance that at least reaches or exceeds a decibel level (e.g., the fans cheering a certain amount may designate the play as of importance).

In some embodiments, engine 200 may include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the collected data, as discussed herein.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
b. transfer the input data to the neural network model,
c. train the model incrementally,
d. determine the accuracy for a specific number of timesteps,
e. apply the trained model to process the newly-received input data,
f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

In Step 306, based on the analysis from Step 304, engine 200 can determine an occurrence of the highlight. In some embodiments, should monitored and collected data/metadata (or content) related to a play be determined to not be a highlight play, then processing of Process 300 can proceed back to Step 304 for further monitoring. In some embodiments, such monitoring is continued until the game is concluded (and can account for time-outs, halftimes, commercials, injuries, and the like).

In Step 308, engine 200 can compile an electronic message or communication that can be electronically sent to a device (e.g., UE 102) of the user. The electronic message, for example, can be a push notification that is sent to the smart phone of a user that enables the user to interact with a series of inputs to remit electronic payment within an account of a player involved in the highlight. In some embodiments, the message or notification can be sent to a device of the user and cause display of a graphical user interface (GUI) that includes interactive interface objects that correspond to players selections (e.g., the players involved in the highlight) and types and/or amounts of assets to transfer to the players' accounts.

According to some embodiments, the communication can be secured to only enable accounts of players involved in the highlight to be subject to payment. In some embodiments, those players not involved in a highlight may have their accounts locked (or read or write access revoked) for a time period (e.g., a Time-To-Live (TTL) tag applied thereto, which prevents unnecessary payment for players that are not part of particular plays). In some embodiments, such control and/or communication functionality can be a by-product of a smart contract that is associated with the event.

In Step 312, engine 200 can receive input corresponding to the engagement of the fan with an account of the participant(s) involved in the highlight. Such engagement can be, but is not limited to, sending them fiat currency, sending them cryptocurrency, providing them a brand endorsement, and the like, as discussed supra. According to some embodiments, Step 312 can involve a smart contract determining and applying read and/or read/write access to the user for the participant's account, thereby enabling the secure access and transfer to the player's account. Such secure access can be granted for a time period (e.g., via a TTL, as discussed above), which can be triggered via the determination of the highlight (as in Step 306).

And, in Step 314, engine 200 can continue monitoring the game play via the protocols effectuated and implemented in Step 304, discussed supra. Such monitoring can occur until the game is completed.

In some embodiments, the athlete receiving the transfer of the funds or reward (or transfer from the user, discussed above) can reject in whole or part or accept, which can provide control to the athlete as to how their account can be accessed by other users.

According to some embodiments, a smart contract can be created that automates the electronic transfer of Step 314. For example, upon the game beginning or prior thereto, the user can compile, generate and/or execute a smart contract that indicates that for certain types of plays, for certain teams and/or certain players, they agree to automatically remit payment to the account of a/the player(s). Such remittance can occur in the same manner as discussed above.

Figure 6:
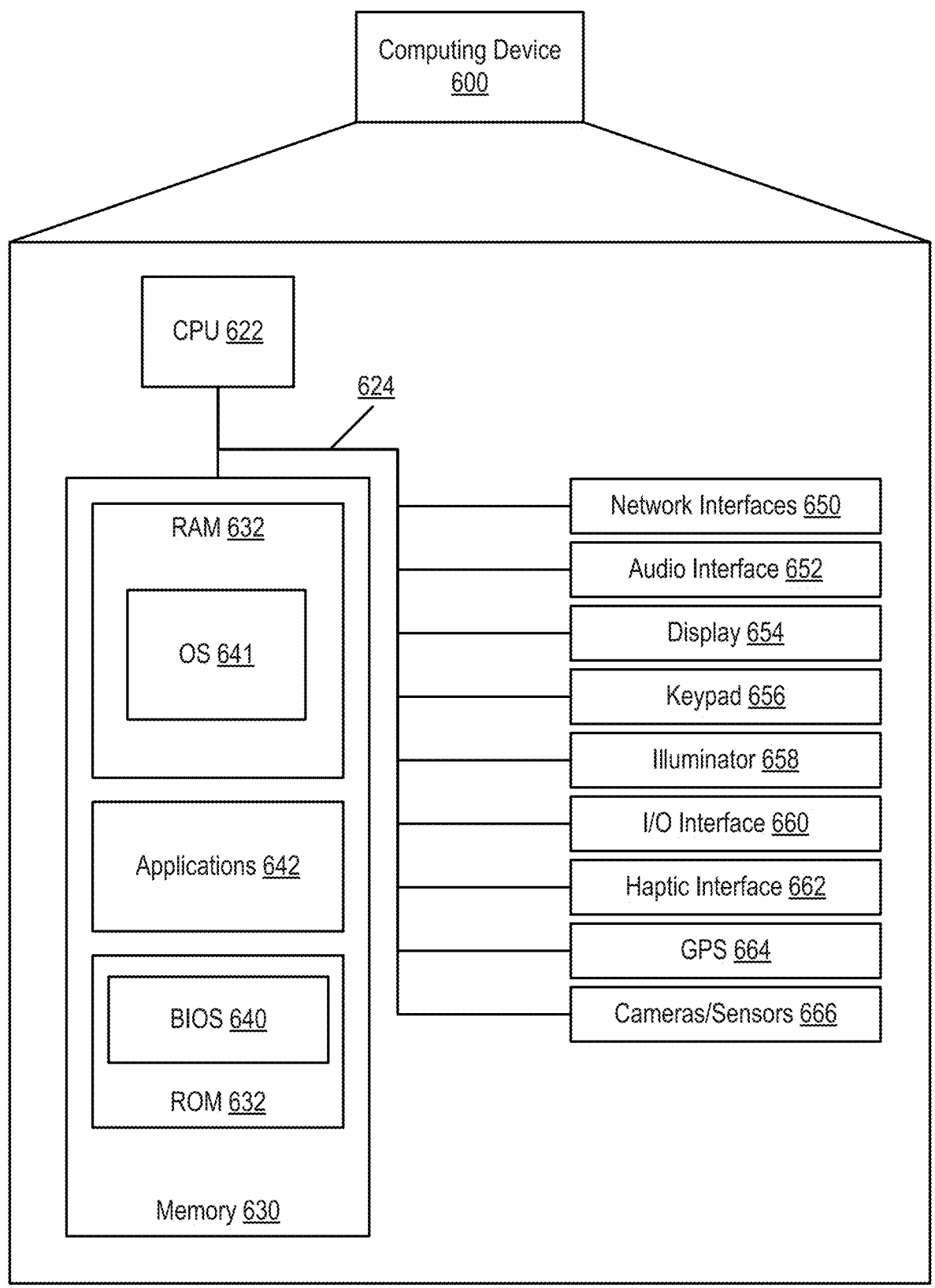
FIG. 6 is a block diagram illustrating a computing device showing an example of a client or server device used in various embodiments of the present disclosure.

FIG. 6 is a schematic diagram illustrating a client device showing an example embodiment of a client device that may be used within the present disclosure. Client device 600 may include many more or less components than those shown in FIG. 6. However, the components shown are sufficient to disclose an illustrative embodiment for implementing the present disclosure. Client device 600 may represent, for example, UE 102 discussed above at least in relation to FIG. 1.

As shown in the figure, in some embodiments, Client device 600 includes a processing unit (CPU) 622 in communication with a mass memory 630 via a bus 624. Client device 600 also includes a power supply 626, one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal or electromagnetic sensors 666. Device 600 can include one camera/sensor 666, or a plurality of cameras/sensors 666, as understood by those of skill in the art. Power supply 626 provides power to Client device 600.

Client device 600 may optionally communicate with a base station (not shown), or directly with another computing device. In some embodiments, network interface 650 is sometimes known as a transceiver, transceiving device, or network interface card (NIC).

Audio interface 652 is arranged to produce and receive audio signals such as the sound of a human voice in some embodiments. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may include any input device arranged to receive input from a user. Illuminator 658 may provide a status indication and/or provide light.

Client device 600 also includes input/output interface 660 for communicating with external. Input/output interface 660 can utilize one or more communication technologies, such as USB, infrared, Bluetooth™, or the like in some embodiments. Haptic interface 662 is arranged to provide tactile feedback to a user of the client device.

Optional GPS transceiver 664 can determine the physical coordinates of Client device 600 on the surface of the Earth, which typically outputs a location as latitude and longitude values. GPS transceiver 664 can also employ other geo-positioning mechanisms, including, but not limited to, tri-angulation, assisted GPS (AGPS), E-OTD, CI, SAI, ETA, BSS or the like, to further determine the physical location of client device 600 on the surface of the Earth. In one embodiment, however, Client device 600 may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of Client device 600. The mass memory also stores an operating system 641 for controlling the operation of Client device 600.

Memory 630 further includes one or more data stores, which can be utilized by Client device 600 to store, among other things, applications 642 and/or other information or data. For example, data stores may be employed to store information that describes various capabilities of Client device 600. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 600.

Applications 642 may include computer executable instructions which, when executed by Client device 600, transmit, receive, and/or otherwise process audio, video, images, and enable telecommunication with a server and/or another user of another client device. Applications 642 may further include a client that is configured to send, to receive, and/or to otherwise process gaming, goods/services and/or other forms of data, messages and content hosted and provided by the platform associated with engine 200 and its affiliates.

According to some embodiments, certain aspects of the instant disclosure can be embodied via functionality discussed herein, as disclosed supra. According to some embodiments, some non-limiting aspects can include, but are not limited to the below method aspects, which can additionally be embodied as system, apparatus and/or device functionality:

Aspect 1. A method comprising:
identifying, by a device, an event, the event comprising a set of participants;
analyzing, by the device, content captured related to real-time action of the event;
determining, by the device, based on the analysis, an occurrence during the event of a highlight, the highlight being a portion of the real-time action that has characteristics at least a threshold degree of difference from other action occurring during the event;
electronically communicating, by the device, over a network, an electronic notification to a user device, the communication comprising an interactive user interface (UI) that enables identification of particular participants within the portion real-time action associated with the highlight and a selection of a digital asset value; and
electronically communicating, via the device, over the network, the digital asset value to an electronic account of a participant identified via interaction with the UI.

Aspect 2. The method of aspect 1, wherein the digital asset value is at least one of a cryptocurrency and fiat.

Aspect 3. The method of aspect 1, wherein the communication of the electronic notification is performed in compliance with a smart contract, the smart contract associated with the event.

Aspect 4. The method of aspect 1, further comprising:
determining a type of the event; and
monitoring the event according to a time period based on the type of event, wherein the analysis of the content captured is based on the time period of the monitoring of the event.

Aspect 5. The method of aspect 1, further comprising:
communicating, over the network, a communication to the identified participant, the communication enabling the participant functionality to accept or deny the communication of the digital asset.

Aspect 6. The method of aspect 1, wherein the highlight is stored in a database upon the determination of the occurrence.

Aspect 7. The method of aspect 1, wherein the user device is a smart phone of the user.

Aspect 8. The method of aspect 1, wherein the event is a live event.

Aspect 9. The method of aspect 1, wherein the user is streaming the event.

Aspect 10. The method of aspect 1, wherein the user is at the event.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

identifying, by a device, an event, the event being a live sporting event at a location, the event comprising a set of participants;

analyzing, by the device, content captured related to real-time action of the event;

determining, by the device, based on the analysis, an occurrence during the event of a highlight, the highlight being a type of play within the live sporting event that triggers a threshold decibel level of fans in attendance at the location, the highlight being a portion of the real-time action that has characteristics at least a threshold degree of difference from other action occurring during the event;

electronically communicating, by the device, over a network, an electronic notification to a user device of a user viewing the live sporting event, the communication comprising an interactive user interface (UI) that enables identification of particular participants within the portion real-time action associated with the highlight and a selection of a digital asset value;

receiving, from the user device, via the UI, identification of a participant within the highlight and the selection of the digital asset value; and electronically communicating, via the device, over the network, the digital asset value to an electronic account of the participant identified via interaction with the UI.

2. The method of claim 1, wherein the digital asset value is at least one of a cryptocurrency and fiat.

3. The method of claim 1, wherein the communication of the electronic notification is performed in compliance with a smart contract, the smart contract associated with the event.

4. The method of claim 1, further comprising:
determining a type of the event; and
monitoring the event according to a time period based on the type of event, wherein the analysis of the content captured is based on the time period of the monitoring of the event.

5. The method of claim 1, further comprising:
communicating, over the network, a communication to the identified participant, the communication enabling the participant functionality to accept or deny the communication of the digital asset.

6. The method of claim 1, wherein the highlight is stored in a database upon the determination of the occurrence.

7. The method of claim 1, wherein the user device is a smart phone of the user.

8. The method of claim 1, wherein the user is streaming the event.

9. The method of claim 1, wherein the user is at the event.

10. A system comprising:
a processor configured to:
identify an event, the event being a live sporting event at a location, the event comprising a set of participants;
analyze content captured related to real-time action of the event;
determine, based on the analysis, an occurrence during the event of a highlight, the highlight being a type of play within the live sporting event that triggers a threshold decibel level of fans in attendance at the location, the highlight being a portion of the real-time action that has characteristics at least a threshold degree of difference from other action occurring during the event;
electronically communicate, over a network, an electronic notification to a user device of a user at the live sporting event, the communication comprising an interactive user interface (UI) that enables identification of particular participants within the portion real-time action associated with the highlight and a selection of a digital asset value;
receive, from the user device, via the UI, identification of a participant within the highlight and the selection of the digital asset value; and
electronically communicate, over the network, the digital asset value to an electronic account of the participant identified via interaction with the UI.

11. The system of claim 10, wherein the digital asset value is at least one of a cryptocurrency and fiat.

12. The system of claim 10, wherein the communication of the electronic notification is performed in compliance with a smart contract, the smart contract associated with the event.

13. The system of claim 10, wherein the processor is further configured to:
determine a type of the event; and
monitor the event according to a time period based on the type of event, wherein the analysis of the content captured is based on the time period of the monitoring of the event.

14. The system of claim 10, wherein the processor is further configured to:
communicate, over the network, a communication to the identified participant, the communication enabling the participant functionality to accept or deny the communication of the digital asset.

15. A non-transitory computer-readable storage medium tangibly encoded with computer-executable instructions that when executed by a processor, perform a method comprising:
identifying, by the device, an event, the event being a live sporting event at a location, the event comprising a set of participants;
analyzing, by the device, content captured related to real-time action of the event;
determining, by the device, based on the analysis, an occurrence during the event of a highlight, the highlight being a type of play within the live sporting event that triggers a threshold decibel level of fans in attendance at the location, the highlight being a portion of the real-time action that has characteristics at least a threshold degree of difference from other action occurring during the event;
electronically communicating, by the device, over a network, an electronic notification to a user device of a user viewing the live sporting event, the communication comprising an interactive user interface (UI) that enables identification of particular participants within the portion real-time action associated with the highlight and a selection of a digital asset value;
receiving, from the user device, via the UI, identification of a participant within the highlight and the selection of the digital asset value; and
electronically communicating, via the device, over the network, the digital asset value to an electronic account of the participant identified via interaction with the UI.

16. The non-transitory computer-readable storage medium of claim 15, wherein the digital asset value is at least one of a cryptocurrency and fiat.

17. The non-transitory computer-readable storage medium of claim 15, wherein the communication of the electronic notification is performed in compliance with a smart contract, the smart contract associated with the event.

18. The non-transitory computer-readable storage medium of claim 15, further comprising:
determining a type of the event; and
monitoring the event according to a time period based on the type of event, wherein the analysis of the content captured is based on the time period of the monitoring of the event.

19. The non-transitory computer-readable storage medium of claim 15, further comprising:
communicating, over the network, a communication to the identified participant, the communication enabling the participant functionality to accept or deny the communication of the digital asset.

\* \* \* \* \*